United States Patent
Ott et al.

(10) Patent No.: US 10,501,646 B2
(45) Date of Patent: Dec. 10, 2019

(54) AQUEOUS BINDER DISPERSIONS INTENDED FOR CATHODIC ELECTROCOAT MATERIALS AND COMPRISING A CROSSLINKER BASED ON 2,2-DIMETHYL-1,3-DIOXOLANE-4-METHANOL-BLOCKED POLYISOCYANATES

(71) Applicant: BASF Coatings GmbH, Muenster (DE)

(72) Inventors: Guenther Ott, Muenster (DE); Markus Oberhoff, Drensteinfurt (DE); Silke Przybilla, Muenster (DE); Karl-Heinz Grosse Brinkhaus, Nottuln (DE); Dominik Stoll, Muenster (DE)

(73) Assignee: BASF Coatings GmbH, Muenster (DE)

( * ) Notice: Subject to any disclaimer, the term of this patent is extended or adjusted under 35 U.S.C. 154(b) by 122 days.

(21) Appl. No.: 15/514,406

(22) PCT Filed: Jul. 31, 2015

(86) PCT No.: PCT/EP2015/067700
§ 371 (c)(1),
(2) Date: Mar. 24, 2017

(87) PCT Pub. No.: WO2016/045842
PCT Pub. Date: Mar. 31, 2016

(65) Prior Publication Data
US 2017/0298236 A1    Oct. 19, 2017

(30) Foreign Application Priority Data
Sep. 26, 2014  (EP) .................................... 14186625

(51) Int. Cl.
| | |
|---|---|
| *C09D 5/44* | (2006.01) |
| *C25D 13/04* | (2006.01) |
| *C09D 163/00* | (2006.01) |
| *C25D 13/22* | (2006.01) |
| *C25D 13/12* | (2006.01) |

(52) U.S. Cl.
CPC ......... *C09D 5/4453* (2013.01); *C09D 5/4438* (2013.01); *C09D 5/4442* (2013.01); *C09D 163/00* (2013.01); *C25D 13/04* (2013.01); *C25D 13/12* (2013.01); *C25D 13/22* (2013.01)

(58) Field of Classification Search
None
See application file for complete search history.

(56) References Cited

U.S. PATENT DOCUMENTS

| | | | |
|---|---|---|---|
| 4,260,147 A | 4/1981 | Houle et al. | |
| 4,260,720 A | 4/1981 | Bosso et al. | |
| 4,268,542 A | 5/1981 | Sakakibara et al. | |
| 5,055,168 A * | 10/1991 | Lawrenz | C08G 18/544 |
| | | | 204/502 |
| 2002/0169247 A1 | 11/2002 | Kuo et al. | |
| 2004/0266905 A1 | 12/2004 | Baumgart et al. | |
| 2015/0337074 A1* | 11/2015 | Uhlianuk | C08G 59/184 |
| | | | 427/327 |

FOREIGN PATENT DOCUMENTS

| | | |
|---|---|---|
| DE | 198 57 867 A1 | 6/2000 |
| EP | 0 505 445 B1 | 11/1994 |
| EP | 0 961 797 B1 | 4/2003 |
| WO | 02/081525 A1 | 10/2002 |
| WO | 03/037952 A1 | 5/2003 |

OTHER PUBLICATIONS

International Search Report dated Aug. 28, 2015 in PCT/EP2015/067700 Filed Jul. 31, 2015.
International Preliminary Report on Patentability dated Apr. 6, 2017 in PCT/EP2015/067700 (with English translation).
International Search Report and Written Opinion dated Aug. 28, 2015 in PCT/EP2015/067700.

* cited by examiner

*Primary Examiner* — Kishor Mayekar
(74) *Attorney, Agent, or Firm* — Oblon, McClelland, Maier & Neustadt, L.L.P.

(57) ABSTRACT

The present invention relates to aqueous binder dispersions for cationic electrocoat materials, comprising as binders amine-modified, hydroxy-functional epoxy resins and comprising as crosslinker at least one fully blocked polyisocyanate blocked at least partly with 2,2-dimethyl-1,3-dioxolane-4-methanol, and also to the use of such cationic electrocoat materials for producing coating systems and to the use of crosslinkers based on polyisocyanates blocked with 2,2-dimethyl-1,3-dioxolane-4-methanol in aqueous binder dispersions.

14 Claims, No Drawings

AQUEOUS BINDER DISPERSIONS INTENDED FOR CATHODIC ELECTROCOAT MATERIALS AND COMPRISING A CROSSLINKER BASED ON 2,2-DIMETHYL-1,3-DIOXOLANE-4-METHANOL-BLOCKED POLYISOCYANATES

BACKGROUND

Technical Field

The present invention relates to aqueous binder dispersions for cathodic electrocoat materials based on modified epoxy resins and also to the use of such cathodic electrocoat materials for producing coating systems and to the use of crosslinkers based on 2,2-dimethyl-1,3-dioxolane-4-methanol-blocked polyisocyanates in the aqueous binder dispersions.

Description of the Related Art

Cationic electrocoating is a coating process frequently employed in particular for priming, and involves the application of water-dilutable synthetic resins carrying cationic groups to electrically conducting bodies by means of direct current. The coating films obtained consequently on the substrate are subsequently cured in an oven. To achieve the desired quality in the resultant coating system it is very important that sufficient curing of the coating system is achieved. In the case of large substrates in particular, such as automobile bodies, however, it may be the case that uniform heating of the substrate and hence of the coating film is not achieved, owing to the size, mass, consistency, and geometry of the substrate. As a result of this nonuniformity, there may be certain areas in which the desired baking temperature is not obtained and in which curing is incomplete (risk of underbaking). This effect is countered with an increase in the temperature, but this is neither eco-friendly nor economical, owing to the greatly increased energy consumption.

The use of modified epoxy resins as binders for cathodic electrocoat materials is known, as described in U.S. Pat. Nos. 4,260,147, 4,260,720, and 4,268,542, for example. EP 0961797 describes, for example, aqueous binder dispersions for cathodic electrocoat materials, based on modified epoxy resins containing amino groups. In that case blocked polyisocyanates are used as crosslinkers. But coating material compositions of this kind are to be improved in terms of the risk of underbaking, and this proves difficult particularly in the case of aqueous binder dispersions for cathodic electrocoat materials. This is because blocked polyisocyanates are used as crosslinkers, if polyisocyanates are being used, because of the storage stability of the aqueous binder dispersions.

DE 19857867 A1 describes reactive polyurethanes and the isocyanate-reactive polyurethanes obtainable from them. These reactive polyurethanes are obtained by reaction of a polyisocyanate with a hydroxy-functional compound which comprises a reactive radical that is inert toward NCO groups and that has at least two isocyanate-reactive groups following liberation of a protecting group. As a result of this liberation of the protecting groups, polyurethane polyols are obtained, which are then reacted in turn to give polyaddition products or polycondensation products.

The object of the present invention is to find new binder dispersions which exhibit an improvement in terms of the risk of underbaking. The new binder dispersions ought to cure as far as possible to completion even at low temperatures (low-temperature curing; low-bake coating materials) while at the same time affording coating systems of high quality. Furthermore, the coating materials ought at the same time to have good storage stability. The coatings obtained from the binder dispersions, moreover, ought to exhibit outstanding resistance toward solvents.

BRIEF SUMMARY

This object is achieved by means of an aqueous binder dispersion for cathodically depositable electrocoat materials, comprising as binder at least one amine-modified, hydroxy-functional epoxy resin, the binder dispersion comprising as crosslinker at least one fully blocked polyisocyanate blocked at least partly with 2,2-dimethyl-1,3-dioxolane-4-methanol. Corresponding binder dispersions have a high reactivity, and so lead to largely complete curing even at relatively low temperatures. As a result it is possible overall to use lower temperatures to bake the electrocoat films, and an improvement is achieved in terms of the risk of underbaking. Moreover, such binder dispersions lead to coating systems of outstanding quality, including in particular in relation to their solvent resistance. A further advantage is that 2,2-dimethyl-1,3-dioxolane-4-methanol is readily available and hence access to the blocked polyisocyanate crosslinkers is improved.

DETAILED DESCRIPTION

An aqueous binder dispersion means a dispersion which comprises primarily water as solvent and which preferably is substantially free from organic solvents. The aqueous dispersions contain preferably more than 50 wt % of water, based on the overall composition. With particular preference the fraction of organic solvents is less than 5 wt %, preferably less than 2 wt %, based on the overall composition.

The binder present in the aqueous binder dispersion for cathodically depositable electrocoat materials is at least one modified epoxy resin. All known modified epoxy resins are suitable in principle. The epoxy resins are the polycondensation resins known per se that have a backbone composed of polyepoxide compounds with alcohols.

Suitable polyepoxide compounds are polyphenol diglycidyl ethers, prepared from polyphenols and epihalohydrins. Polyphenols which can be used include, for example, the preferred polyphenols bisphenol A and bisphenol F. Likewise suitable are 1,1-bis(4-hydroxyphenyl)-n-heptane, 4,4'-dihydroxybenzophenone, 1,1-bis(4-hydroxyphenyl)ethane, 2,2-bis(4-hydroxy-tert-butylphenyl)propane, bis(2-hydroxynaphthyl)methane, 1,5-dihydroxynaphthalene, and phenolic novolak resins. Likewise suitable epoxide compounds are diglycidyl ethers of polyhydric alcohols such as ethylene glycol, diethylene glycol, triethylene glycol, 1,2-propylene glycol, glycerol, and 2,2-bis(4-hydroxycyclohexyl)propane. Also possible is the use of diglycidyl esters of polycarboxylic acids, such as, for example, oxalic acid, succinic acid, glutaric acid, terephthalic acid, 2,6-naphthalenedicarboxylic acid, dimerized linolenic acid, etc. Typical examples are glycidyl adipate and glycidyl phthalate. Additionally suitable are hydantoin epoxides, epoxidized polybutadiene, and diepoxide compounds obtained by epoxidation of an olefinically unsaturated alicyclic compound. The hydroxy-functional epoxy resins are preferably epoxy resins prepared by condensation of bisphenol A and/or bisphenol F with epichlorohydrin. These compounds preferably comprise hydroxyl groups along the chain and epoxide groups at the ends.

The hydroxy-functional epoxy resins are preferably prepared using aromatic or aliphatic compounds which contain a hydroxyl, a carboxyl, a phenolic, or a thiol group, or which are a mixture of such compounds, and which react monofunctionally with respect to epoxide groups under the reaction conditions prevailing during the preparation of the epoxy resins. Preferred is the use, for example, of dodecylphenol, phenol, or butoxypropanol for preparing the hydroxy-functional epoxy resins. The hydroxy-functional epoxy resin therefore preferably comprises dodecylphenol, phenol and/or butoxypropanol in copolymerized form.

The amine-modified hydroxy-functional epoxy resins are obtained from the hydroxy-functional epoxy resins by reaction of unreacted epoxide groups with amines. The amine ought preferably to be a compound soluble in water. Examples of such amines are mono- and dialkylamines, such as methylamine, ethylamine, propylamine, butylamine, dimethylamine, diethylamine, dipropylamine, methylbutylamine, and the like. Likewise suitable are alkanolamines such as methylethanolamine, diethanolamine, and the like. Further preferred are dialkylaminoalkylamines such as dimethylaminoethylamine, diethylaminopropylamine, dimethylaminopropylamine, and the like. Low molecular mass amines are used in the majority of cases, though it is also possible to employ monoamines of relatively high molecular mass. Polyamines having primary and secondary amino groups can be reacted in the form of their ketimines with the epoxide groups, such as, for example, the bismethylisobutyl diketimine of diethylenetriamine. The ketimines are prepared from the polyamines in a known way. The amines may also include other groups as well, although these ought not to disrupt the reaction of the amine with the epoxy group and ought also not to result in gelling of the reaction mixture. The modified epoxy resins can have primary, secondary, and tertiary amine groups. Moreover, the hydroxy-functional epoxy resins may be modified with different amines.

Preferably the hydroxy-functional epoxy resins are reacted with at least one amine selected from the group consisting of mono- and dialkylamines, alkanolamines, dialkylaminoalkylamines, and ketimines of polyamines having primary and secondary amino groups. Very preferably the at least one amine is selected from the group consisting of methylethanolamine, diethanolamine, dimethylaminoethylamine, diethylaminopropylamine, dimethylaminopropylamine, and bismethylisobutyl diketimine. More preferably the hydroxy-functional epoxy resin is reacted with diethanolamine.

The amine-modified hydroxy-functional epoxy resins can be prepared by addition of catalysts, preferably of tertiary amines, quaternary ammonium salts, phosphine or phosphine derivatives and/or phosphine salts. The phosphine used may be any phosphine that does not contain any disruptive groups. Examples of such phosphines are aliphatic, aromatic or alicyclic phosphines, with specific examples that may be mentioned including the following phosphines: lower trialkylphosphines, such as trimethylphosphine, triethylphosphine, tripropylphosphine, and tributyl-phosphine; mixed lower alkylphenylphosphines, such as phenyldimethylphosphine, phenyldiethylphosphine, phenyldipropylphosphine, diphenylmethylphosphine, diphenylethylphosphine, and diphenylpropylphosphine; triphenylphosphine; alicyclic phosphines, such as tetramethyleneethylphosphine, and the like. Particularly preferred as catalyst is triphenylphosphine or N,N-dimethylbenzylamine.

The charges necessary for water-dilutability and for electrical deposition can be generated by protonation with water-soluble acids (e.g., formic acid, lactic acid, and acetic acid) or else by reaction of the oxirane groups with salts of an amine or of a sulfide/acid or phosphine/acid mixture. As the salt of an amine, the salt of a tertiary amine can be used with preference. The amine fraction of the amine-acid adduct is an amine which may be unsubstituted or substituted, as in the case of hydroxylamine; these substituents ought not to disrupt the reaction of the amine-acid adduct with the polyepoxide, and the reaction mixture ought not to gel. Preferred amines are tertiary amines, such as dimethylethanolamine, triethylamine, trimethylamine, triisopropylamine, and the like. The amine-acid mixture is obtained by reacting the amine with the acid in a known way.

The degree of neutralization (measured as the ratio of MEQ acid to MEQ base) is preferably from 30% to 50%, more preferably from 35% to 45%.

The crosslinking agent used is at least one fully blocked polyisocyanate blocked at least partly by means of 2,2-dimethyl-1,3-dioxolane-4-methanol. "Fully blocked" here means that the polyisocyanate no longer possesses any free isocyanate groups and therefore that 100 mol % of the isocyanate groups originally present in the polyisocyanate are blocked. By "at least partial blocking" with 2,2-dimethyl-1,3-dioxolane-4-methanol is meant that at least some of the isocyanate groups originally present in the polyisocyanate are blocked with 2,2-dimethyl-1,3-dioxolane-4-methanol, while any remaining isocyanate groups present originally in the polyisocyanate are blocked with one or more blocking agents other than 2,2-dimethyl-1,3-dioxolane-4-methanol.

Preferably 50 to 100 mol % of the isocyanate groups originally present in the polyisocyanate are blocked with 2,2-dimethyl-1,3-dioxolane-4-methanol, and 0 to 50 mol % of the isocyanate groups originally present in the polyisocyanate are blocked with one or more blocking agents other than 2,2-dimethyl-1,3-dioxolane-4-methanol.

More preferably 75 to 100 mol % of the isocyanate groups originally present in the polyisocyanate are blocked with 2,2-dimethyl-1,3-dioxolane-4-methanol, and 0 to 25 mol % of the isocyanate groups originally present in the polyisocyanate are blocked with one or more blocking agents other than 2,2-dimethyl-1,3-dioxolane-4-methanol.

Very preferably 90 to 100 mol % of the isocyanate groups originally present in the polyisocyanate are blocked with 2,2-dimethyl-1,3-dioxolane-4-methanol, and 0 to 10 mol % of the isocyanate groups originally present in the polyisocyanate are blocked with one or more blocking agents other than 2,2-dimethyl-1,3-dioxolane-4-methanol.

In one very preferred embodiment, the fully blocked polyisocyanate is blocked completely with 2,2-dimethyl-1,3-dioxolane-4-methanol. This means that in a case of this kind, all of the isocyanate groups originally present on the polyisocyanate are blocked with 2,2-dimethyl-1,3-dioxolane-4-methanol.

The blocking agent whose use is mandatory, 2,2-dimethyl-1,3-dioxolane-4-methanol, is also known under the name 2,3-O-isopropylideneglycerol and is available for example under the name Solketal® from the company Glaconchemie GmbH.

Examples of suitable blocking agents other than 2,2-dimethyl-1,3-dioxolane-4-methanol for preparing the fully blocked polyisocyanates are as follows:

i) phenols, such as phenol, cresol, xylenol, nitrophenol, ethylphenol, tert-butylphenol, hydroxybenzoic acid, esters of this acid, or 2,5-di-tert-butyl-4-hydroxytoluene;

ii) lactams, such as ε-caprolactam, δ-valero-lactam, γ-butyrolactam, or β-propiolactam;

iii) active methylenic compounds, such as diethyl malonate, dimethyl malonate, ethyl or methyl acetoacetate, or acetylacetone;

iv) alcohols other than 2,2-dimethyl-1,3-dioxolane-4-methanol, such as methanol, ethanol, n-propanol, isopropanol, n-butanol, isobutanol, tert-butanol, n-amyl alcohol, tert-amyl alcohol, lauryl alcohol, ethylene glycol monomethyl ether, ethylene glycol monoethyl ether, ethylene glycol monobutyl ether, ethylene glycol mono-n-hexyl ether, diethylene glycol monomethyl ether, diethylene glycol monoethyl ether, diethylene glycol monobutyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromo-hydrin, 1,4-cyclohexyldimethanol, or acetocyanohydrin;

v) mercaptans such as butyl mercaptan, hexyl mercaptan, tert-butyl mercaptan, tert-dodecyl mercaptan, 2-mercaptobenzothiazole, thio-phenol, methylthiophenol, or ethylthiophenol;

vi) acid amides such as acetoanilide, acetoanisidinamide, acrylamide, methacryl-amide, acetamide, stearamide, or benzamide;

vii) imides such as succinimide, phthalimide, or maleimide;

viii) amines such as diphenylamine, phenylnaphthyl-amine, xylidine, N-phenylxylidine, carbazole, aniline, naphthylamine, butyl amine, dibutylamine, or butylphenylamine;

ix) imidazoles such as imidazole or 2 ethylimidazole;

x) ureas such as urea, thiourea, ethyleneurea, ethylenethiourea, or 1,3-diphenylurea;

xi) carbamates such as phenyl N-phenylcarbamate or 2-oxazolidone;

xii) imines such as ethyleneimine;

xiii) oximes such as acetone oxime, formaldioxime, acetaldoxime, acetoxime, methyl ethyl ketoxime, diisobutyl ketoxime, diacetyl monoxime, or benzophenone oxime;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, imidazoles, or triazoles; and also xvii) 1,2-polyols such as ethylene glycol, propylene glycol, or 1,2-butanediol;

xviii) 2-hydroxy esters such as 2-hydroxyethyl acrylate or 2-hydroxyethyl methacrylate;

xix) mixtures of the aforementioned blocking agents.

Polyisocyanates which can be used for preparing the polyisocyanates fully blocked in accordance with the invention are all known polyisocyanates, not only aliphatic but also aromatic polyisocyanates or mixtures of aromatic and aliphatic polyisocyanates. It is possible here to use not only monomeric polyisocyanates, and also dimers or trimers of the polyisocyanates, but also oligomeric or polymeric polyisocyanates. Preferred isocyanates are those whose monomeric constituent contains about 3 to about 36, more particularly about 8 to about 15 carbon atoms. Examples of suitable such monomeric polyisocyanates are diisocyanates such as trimethylene diisocyanate, tetramethylene diisocyanate, pentamethylene diisocyanate, hexamethylene diisocyanate, propylene diisocyanate, ethylethylene diisocyanate, methyltrimethylene diisocyanate, trimethylhexamethylene diisocyanate, xylylene diisocyanate, 1,3-cyclopentylene diisocyanate, 1,4-cyclohexylene diisocyanate, 1,2-cyclohexylene diisocyanate, 4,4'-diphenylmethane diisocyanate, 1,5-naphthylene diisocyanate, toluene 2,4-diisocyanate, isophorone diisocyanate, and 4,4'-diisocyanatodicyclohexylmethane. Polyisocyanates of higher isocyanate functionality can also be used, such as tris(4-isocyanatophenyl)methane, 2,4,4'-triisocyanatodiphenylmethane, or bis(2,5-diisocyanato-4-methylphenyl)methane. These polyisocyanates may also be used in the form of dimer or trimer, or may serve as building blocks for oligomeric or polymeric polyisocyanates. Furthermore, mixtures of polyisocyanates can also be utilized. Preference is given to oligomeric or polymeric polyisocyanates, more preferably oligomeric polyisocyanates having an NCO functionality of preferably 2.4 to 4.

Preference is given to using aromatic polyisocyanates, more preferably oligomers of aromatic polyisocyanates having an NCO functionality of preferably 2.4 to 4. Particularly preferred is an oligomeric 4,4'-diphenylmethane diisocyanate (MDI) which is available for example as Lupranat M20S from BASF.

The aromatic polyisocyanates blocked in accordance with the invention, in particular, have a high reactivity and so prevent underbaking, especially the blocked oligomeric 4,4'-diphenylmethane diisocyanate.

The polyisocyanates blocked in accordance with the invention and used as crosslinking agents are employed generally in an amount of 10 to 50 wt %, preferably 25 to 40 wt %, based on the binder fraction in the aqueous binder dispersions. This means that the fraction of the polyisocyanates fully blocked in accordance with the invention is 10 to 50 wt % or 25 to 40 wt %, respectively, of the total binder fraction of the aqueous binder dispersion.

The aqueous binder dispersions can be prepared by mixing the binder and the crosslinker in water. The modification of the hydroxy-functional epoxy resins with amines takes place preferably in the presence of the at least one 2,2-dimethyl-1,3-dioxolane-4-methanol-blocked polyisocyanate crosslinker.

The aqueous binder dispersions preferably have binder particles with an average size of 50 to 200 nm, more preferably of 60 to 160 nm.

The aqueous binder dispersions preferably have a solids fraction of 20% to 50%, more preferably of 32% to 42%.

The electrocoat materials may of course comprise further electrocoat-specific constituents of the kind known from the relevant prior art. Besides the binder dispersions of the invention, the electrocoat materials preferably comprise pigments and/or fillers. Pigments and fillers that can be used include in principle all organic and inorganic pigments and fillers.

Typical inorganic pigments are oxide and oxyhydroxide pigments, such as titanium dioxide, zinc oxide, iron oxide, and chromium oxide, for example, mixed-phase oxide pigments, such as bismuth molybdenum vanadium oxide yellow, chromium titanium yellow, spinel blue, iron manganese brown, zinc iron brown, iron manganese black, and spinel black, for example, sulfide pigments and sulfide selenide pigments, such as zinc sulfide, for example, lithopone, cadmium yellow and cadmium red, carbonate pigments, such as calcium carbonate (with the technical restriction on application as stated above), mixed-phase chromate and chromate-molybdenum pigments, such as chromium yellow, molybdate orange, and molybdate red, for example, complex salt pigments, such as iron blue, for example, silicate pigments, such as aluminum silicate and ultramarine (blue, violet, and red), for example, pigments composed of chemical elements, such as aluminum, for example, copper-zinc alloys, and pigmentary carbon black, and also other pigments, such as barium sulfate, for example. Examples of typical representatives of low-solubility bismuth compounds are bismuth subnitrate and bismuth subsalicylate, which may also act catalytically as crosslinking catalysts, for example.

Typical organic pigments are monoazo pigments, disazo pigments, and polycyclic pigments such as perylene pigments and phthalocyanine pigments, for example.

Typical inorganic fillers are silicates, such as talc and kaolin, for example, silicas, such as precipitated or fumed silicas, for example, oxides, such as aluminum hydroxide or magnesium hydroxide, for example, sulfates, such as blanc fixe and calcium sulfates, for example, and also various carbonates.

For the present invention there is no need for a sharp distinction between pigments and fillers. In the art, a distinction is frequently made using the refractive index. With an index of more than 1.7, they are pigments; with an index below this figure, they are fillers. The aqueous preparations of the invention are preferably pigmented coating material compositions, very preferably cathodically depositable electrocoat materials.

The binder dispersion of the invention may be admixed before, during and/or after its production with at least one customary coatings additive. The skilled person is able to identify such coatings additives on the basis of his or her common general knowledge. The stated coatings additives are preferably added after the dispersion has been produced.

Examples of suitable additives are thermally curable reactive diluents, low-boiling and/or high-boiling organic solvents, UV absorbers, light stabilizers, radical scavengers, thermolabile radical initiators, crosslinking catalysts, tin-containing catalysts for example, deaerating agents, slip additives, polymerization inhibitors, defoamers, emulsifiers, wetting agents, adhesion promoters, flow control agents, film-forming assistants, rheology control additives, or flame retardants. Other examples of suitable coatings additives are described in the Lackadditive textbook by Johan Bieleman, Wiley-VCH, Weinheim, N.Y., 1998.

Use of the binder dispersions of the invention in cationic electrocoat materials results in the deposition of films which have outstanding properties and also lend themselves well to being coated over.

A further subject of the present invention is the use of the aqueous binder dispersions of the invention in cathodic electrocoat materials, and also a process for cathodic electrocoating using the aqueous binder dispersions of the invention. The resulting cathodic electrocoat materials of the invention can be used for the coating of electrically conductive substrates by means of cathodic electrocoating. The cathodic electrocoat material of the invention is used preferably for the coating of metallic substrates. Suitable metallic substrates are, for example, substrates of steel, aluminum, copper, alloys of different metals, or the like. Substrates of steel are used with preference. Particular preference is given to using substrates of phosphatized metallic substrates, more particularly substrates of phosphatized steel. Phosphatized metallic substrates are metallic substrates which have been given phosphate-containing inorganic conversion coats as a result of corresponding chemical pretreatment. Particularly preferred substrates are motor vehicle bodies or parts thereof.

Cathodic electrocoating is a process for the coating of electrically conductive substrates, in which 1) the substrate is immersed into an aqueous electrocoat material which comprises at least one cathodically depositable binder,
2) the substrate is connected as cathode,
3) a film is deposited on the substrate by means of direct current,
4) the substrate is removed from the electrocoat material, and
5) the deposited coating film is baked.

Cathodic electrocoating is used in particular for the priming of workpieces.

The temperature of the electrocoating bath ought customarily to be between 15 to 40° C., preferably between 25 and 35° C. The applied voltage may vary within a wide range and may for example be between 50 and 500 volts. Operation takes place typically, however, with voltages of between 250 and 400 volts. Following deposition, the coated article is rinsed and is ready for baking. The coating films deposited are baked generally at temperatures of 130 to 220° C. over a time of 8 to 60 minutes, preferably at 150 to 180° C. over a time of 12 to 30 minutes. The advantage of the coating films of the invention, obtained from the electrocoat materials of the invention comprising the binder dispersions of the invention, is that these coating films crosslink completely even at relatively low temperatures, thereby reducing the risk of underbaking.

Another subject of the present invention, accordingly, is a substrate coated with the electrocoat material of the invention comprising the binder dispersions of the invention, more particularly a metallic substrate, such as a substrate of steel, aluminum, copper, alloys of different metals, or the like, for example, preferably a substrate of phosphatized metal, more particularly of phosphatized steel. Very particular preference is given to motor vehicle bodies or parts thereof that are coated accordingly.

Additionally subjects of the invention are multicoat paint systems which comprise a cathodic electrocoat system based on the binder dispersion of the invention. The electrocoat systems and the corresponding multicoat paint systems are preferably automobile coating systems.

A subject of the invention, moreover, is the use of the fully blocked polyisocyanates blocked at least partly with 2,2-dimethyl-1,3-dioxolane-4-methanol as crosslinkers in aqueous binder dispersions comprising as binder at least one amine-modified, hydroxy-functional epoxy resin.

Preference in this context is given to using the above-stated polyisocyanates and the above-stated, amine-modified, hydroxy-functional epoxy resins.

EXAMPLES

Methods of Determination:
Determining the Glass Transition Temperature Tg:
The glass transition temperature Tg is determined by means of Differential Scanning calorimetry (DSC) in accordance with DIN 53765 (03.1994; Testing of plastics and elastomers—Thermal Analysis—Differential Scanning calorimetry (DSC)) at a heating rate of 10 K/min.

Determining the NCO Content:
The NCO content is determined quantitatively by reacting the NCO groups (isocyanates) with an excess of dibutylamine to give urea derivatives and then back-titrating the excess amine with HCl. The NCO content indicates the isocyanate content in wt % and can be converted into the NCO equivalent weight, which indicates the number of grams of substance containing one mole of NCO groups.

Determining the Solids Content:

Approximately 2 g of sample are weighed out into an aluminum boat which has been dried beforehand, and the sample and boat are dried in a drying cabinet at 130° C. for an hour, cooled in a desiccator, and then reweighed. The residue (i.e., nonvolatile fraction) corresponds to the solids fraction or solids content. If the solids content has been determined in a procedure different from this, time and temperature are reported accordingly, in parentheses, for example.

Determining the Binder Fraction:

The binder fraction in each case is the fraction of the coating material that is soluble in tetrahydrofuran (THF) prior to crosslinking. For its determination, a small sample is dissolved in 50 to 100 times the amount of THF, insoluble constituents are removed by filtration, and subsequently the solids content is determined in line with the description above.

Determining the OH Number and the Acid Number or Acid Content:

The acid number (AN) is determined according to DIN 53402 and the OH number (hydroxyl number) according to DIN 53240. The acid number can be converted into the acid content.

MEQ Acid and MEQ Base

The MEQ (milli-equivalent) figure indicates the number of milliequivalents of acids or bases that are present in 100 g of the nonvolatile fraction (solids) of a coating material or binder. For the determination, the weighed-out sample (2 to 5 g, based on binder) is admixed with a suitable solvent, such as methoxypropanol or butyl glycol, and titrated with potassium hydroxide solution for the MEQ acid figure and with hydrochloric acid for the MEQ base figure. Details can be found in DIN EN ISO 15880.

Epoxide Equivalent Weight:

The determination of the epoxide equivalent weight serves for determining the amount of epoxidically bonded oxygen in epoxy-functional polymers. The epoxide equivalent weight is understood to be the amount of epoxy resin in g that contains 16 g of epoxidically bonded oxygen, i.e., 1 mol of epoxy groups. The resin is dissolved in a mixture of dichloromethane and acetic acid. The solution is admixed with N-cetyl-N,N,N-trimethylammonium bromide and is titrated with perchloric acid in glacial acetic acid, using crystal violet as indicator. Reaction of the bromide salt with perchloric acid produces hydrogen bromide (HBr), which is added onto the molecule with opening of the oxirane ring. Each mole of epoxy function requires 1 mol of perchloric acid. If the reaction has proceeded to completion, the indicator, finally, becomes protonated by excess protons, and there is a color change to green via blue. Details can be found in DIN EN ISO 7142 and DIN 16945.

Determining the Average Particle Size:

The average size of the particles of binder in the binder dispersions is measured using the Zetasizer Nano S90 photon correlation spectrometer from Malvern, UK. The parameter evaluated is the "volume mean".

Crosslinker 1:

Preparation of a Crosslinker for an Electrocoating Composition

A reactor equipped with a stirrer, reflux condenser, internal thermometer, and inert gas inlet is charged with 1053.5 g of 2,3-O-isopropylidene glycerol (2,2-dimethyl-1,3-dioxolane-4-methanol, Solketal®; Glaconchemie GmbH, D-06217 Merseburg) under a nitrogen atmosphere. 1.4 g of dibutyltin dilaurate are added, the mixture is heated to 50° C., and 878.4 g of isomers and higher-functionality oligomers based on 4,4'-diphenylmethane diisocyanate with an NCO equivalent weight of 135 g/eq (Lupranat M20S, BASF; NCO functionality about 2.7; amount of 2,2'- and 2,4'-diphenylmethane diisocyanate below 5%) are added dropwise at a rate such that the product temperature remains below 70° C. Toward the end of the addition, the temperature is allowed to rise to 100° C. and subsequently this temperature is maintained for a further 90 minutes. At the subsequent check, NCO groups are no longer detectable. Cooling is commenced and the product is diluted by addition of 175.0 g of Pluriol C 1651 (dibutoxyethoxyformal, manufacturer: BASF SE) and 66.7 g of ethanol, followed by cooling to 65° C. The solids content is 80%.

Binder Dispersion 1:

Preparation of a Low-Solvent Aqueous Binder Dispersion Comprising a Cathodically Depositable Synthetic Resin Having Primary Amino Groups and Hydroxyl Groups, and the Crosslinker 1.

A laboratory reactor heated with heat transfer oil and equipped with stirrer, reflux condenser, thermometer, and inert gas inlet tube is charged with 961.2 parts of a commercial epoxy resin based on bisphenol A with an epoxide equivalent weight (EEW) of 186 g/eq, 63.9 parts of phenol, 52.4 parts of dodecylphenol, 218.9 parts of bisphenol A, and 68.4 parts by xylene, and this initial charge is heated to 130° C. with stirring and with nitrogen introduced. When 125° C. have been reached, 2.6 parts of N,N-dimethylbenzylamine are added. An exothermic reaction ensues, with the temperature rising to 146° C. After the temperature has dropped to 137° C., a further 1.2 parts of N,N-dimethylbenzylamine are added. The temperature is allowed to fall further and is held at 130° C. until the epoxide equivalent weight (EEW) has reached 870 g/eq (about 3 hours).

Then, with cooling, 967.1 parts of the crosslinker from example 1 and also 31.8 parts of butyl glycol and 198.6 parts of isobutanol are added. When the temperature has dropped to 96° C., 71.3 parts of a 70% strength solution of the bismethylisobutyl diketimine of diethylenetriamine in methyl isobutyl ketone (MIBK) and also 79.2 parts of N-methylethanolamine are added. 30 minutes later, when the temperature has risen to 100° C., 19.3 parts of N,N-dimethylaminopropylamine are added. 20 minutes later, the batch is cooled to 80° C., during which it is diluted with 152.4 parts of Loxanol PL 5060 (BASF SE) and 100 parts of phenoxypropanol, and discharged.

Subsequently, 2105.4 parts of the resin mixture are introduced in a separate dispersing vessel into a mixture of 1118.9 parts of fully demineralized water and 69.2 parts of 88% strength lactic acid, with stirring. When the mixture has become homogeneous, it is slowly diluted with a further 1903.2 parts of fully demineralized water.

This gives an aqueous cationic dispersion which is subsequently freed from its volatile solvents by means of azeotropic vacuum distillation at 40° C., with the organic distillate being replaced by fully demineralized water. Filtration over K 900 plate filters (from Seitz) gives a dispersion having the following characteristics:

Solids content: 32.4%
Base content: 0.687 meq/g resin solids*)
Acid content: 0.328 meq/g resin solids*)
Mean particle size: 98 nm**)
Sedimentation stability: no sediment after 2 months' storage time at room temperature

*) milliequivalents/gram resin solids
**) measured using Zetasizer Nano S90 photon correlation spectrometer from Malvern Crosslinker 2:

Preparation of a Comparative Crosslinker

The crosslinker from EP 0961797 B1 (page 6 lines 43-52) is used. A reactor equipped with a stirrer, reflux condenser, internal thermometer, and inert gas inlet is charged with 1084 g of isomers and higher-functional oligomers based on 4,4'-diphenylmethane diisocyanate with an NCO equivalent weight of 135 g/eq (Lupranat M20S, BASF; NCO functionality about 2.7; amount of 2,2'- and 2,4'-diphenylmethane diisocyanate below 5%) under a nitrogen atmosphere. 2 g of dibutyltin laurate are added and 1314 g of butyl diglycol are added dropwise at a rate such that the product temperature remains below 70° C. It may be necessary to carry out cooling. After the end of the addition, the temperature is maintained at 70° C. for a further 120 minutes. At the subsequent check, NCO groups are no longer detectable. Cooling takes place to 65° C.

The solids content is >97%.

Binder Dispersion 2 (Comparative):

Preparation of the Low-Solvent Aqueous Binder Dispersion Comprising a Cathodically Depositable Synthetic Resin and Crosslinker 2 as a Comparative.

The same procedure is operated as for the binder dispersion 1 example. Now, instead of the crosslinker 1, 797.6 parts of the crosslinker 2 (corresponding in terms of solids content to the amount of crosslinker 1 in the binder dispersion 1 example) are used.

Following removal of the volatile solvents by azeotropic vacuum distillation at 40° C., the product is diluted with fully demineralized water to a target solids content of 32%.

Filtration over K 900 plate filters (from Seitz) gives a dispersion having the following characteristics:

Solids content: 32.2%
Base content: 0.684 meq/g resin solids*)
Acid content: 0.323 meq/g resin solids*)
Mean particle size: 110 nm**)
Sedimentation stability: no sediment after 2 months' storage time at room temperature

*) milliequivalents/gram resin solids
**) measured using Zetasizer Nano S90 photon correlation spectrometer from Malvern Production of a Grinding Resin A Grinding resin A from EP 0961797 (page 9 lines 17-21) is used. A reactor equipped with stirring mechanism, internal thermometer, nitrogen inlet, and water separator with reflux condenser is charged with 30.29 parts of an epoxy resin based on bisphenol A and having an epoxide equivalent weight (EEW) of 188 g/eq, 9.18 parts of bisphenol A, 7.04 parts of dodecylphenol, and 2.37 parts of butyl glycol. This initial charge is heated to 110° C., 1.85 parts of xylene are added, and the xylene is distilled off again under a gentle vacuum together with possible traces of water. Then 0.07 part of triphenylphosphine is added and the mixture is heated to 130° C. After exothermic heat production to 150° C., reaction is allowed to continue at 130° C. for one hour more. The EEW of the reaction mixture is at that point 860 g/eq. It is cooled, during which 9.91 parts of butyl glycol and 17.88 parts of a polypropylene glycol diglycidyl ether of EEW 333 g/eq (DER 732, Dow Chemicals) are added. At 90° C., 4.23 parts of 2,2'-aminoethoxyethanol ($H_2N$—$CH_2$—$CH_2$—O—$CH_2$—$CH_2$—OH) and, 10 minutes later, 1.37 parts of N,N-dimethylaminopropylamine are added. After a brief exotherm, the reaction mixture is maintained at 90° C. for 2 hours more, until the viscosity remains constant, and is then diluted with 17.66 parts of butyl glycol. The resin has a solids content of 69.8% and a viscosity of 5.5 dPas (measured on a 40% resin solution diluted with propylene glycol monomethyl ether (Solvenon PM, BASF), on a cone/plate viscometer at 23° C.). For greater ease of handling, the resin is additionally neutralized and diluted with 2.82 parts of glacial acetic acid and 13.84 parts of fully demineralized water. This reduces the original solids content to 60%.

Production of Aqueous Pigment Pastes

In analogy to the process described in EP 0505445 B1 (page 10 lines 35-42), aqueous pigment pastes are produced from the starting materials listed in table 1 below. First of all, deionized water and the grinding resin A are premixed. Then the remaining constituents are added, in accordance with the quantity figures in table 1, and the mixture is mixed for 30 minutes on a high-speed dissolver stirring mechanism. The mixture is subsequently dispersed to a Hegmann fineness of less than 12 on a small laboratory mill for 1 to 1.5 hours. The quantities given are weight fractions.

TABLE 1

Pigment pastes

|  | Pigment paste A | Pigment paste B |
| --- | --- | --- |
| Grinding resin A | 40 | 40 |
| Fully demineralized water | 10.5 | 9.4 |
| DBTO moist (85% form) | 3.6 |  |
| Bismuth subnitrate |  | 6 |
| Carbon black | 0.5 | 0.5 |
| Aluminum silicate | 8 | 8 |
| Titanium dioxide* | 35.2 | 33.1 |
| Deuteron MK-F6** | 2.2 | 3 |

*TI-PURE R900, DuPont
**Polyurea, Deuteron

Electrocoating Materials A and B:

Inventive and Comparative Example of an Inventive and a Conventional Cathodic Electrocoat Material In order to produce a conventional and the inventive cathodic electrocoat material, binder dispersions 1 and 2 and aqueous pigment paste A are combined with fully demineralized water in the quantities (weight fractions) indicated in table 2. The procedure here is to introduce the binder dispersion first and to dilute it with fully demineralized water. Then, with stirring, the pigment paste is introduced. This gives the inventive electrocoat material A and also the conventional electrocoat material B.

TABLE 2

Inventive and conventional electrocoat materials

| Batch formula | Inventive electrocoating bath A | Conventional electrocoating bath B |
| --- | --- | --- |
| Binder dispersion 1 | 2356.6 |  |
| Binder dispersion 2 |  | 2371.2 |
| Fully demineralized water | 1865.1 | 1850.5 |
| Pigment paste A | 578.3 | 578.3 |
| Total: | 4800.0 | 4800.0 |

The electrocoating baths are aged with stirring at room temperature for 3 days. The coating films are deposited over 2 minutes at 220-270 volts deposition voltage and 350 volts breakdown voltage (bath temperature 32° C.) onto cathodically connected, zinc-phosphatized steel test panels without a Cr(VI) rinse in the pretreatment process.

TABLE 3

Bath characteristics (pH levels, conductivities, solids contents) of the inventive E-coat materials

|  | E-coat material A | E-coat material B (comparative) |
|---|---|---|
| pH | 6.1 | 6.0 |
| Conductivity (mS/cm) | 1.37 | 1.39 |
| Solids content (30 minutes at 180° C.) | 20.9 | 21.6 |

The deposited films are rinsed with deionized water and baked at 175° C. (substrate temperature) for 15 minutes (also at 160° C. for the determination of glass transition temperature Tg as a measure of crosslinking).

TABLE 4

Film properties and glass transition temperatures Tg of the resulting E-coat systems A and B

|  | E-coat system A | E-coat system B (comparative) |
|---|---|---|
| Film thickness (μm) | 20.1 | 20.8 |
| Leveling | very good | very good |
| Glass transition temperature Tg (160° C.) | 79 | 72 |
| Glass transition temperature Tg (175° C.) | 82 | 81 |

The 72° C. Tg glass transition temperature of the comparative paint system B on 160° C. baking shows as yet incomplete crosslinking by comparison with the 81° C. Tg at 175° C. baking. In contrast, the 79° C. Tg on 160° C. baking shows the inventive E-coat system A to be almost at the end state (Tg=82° C. on 175° C. baking). Even at 160° C., the crosslinking density for coating system A has developed further than in the case of the comparative coating system B, and therefore exhibits improved underbake security in comparison to the prior art.

Binder Dispersion 3

Preparation of a Low-Solvent Aqueous Binder Dispersion Comprising a Cathodically Depositable Synthetic Resin with Hydroxyl Groups, but without Primary Amino Groups, and Comprising the Crosslinker 1.

A binder dispersion is prepared in accordance with EP 0 961 797 B1:

A laboratory reactor heated with heat transfer oil and equipped with stirrer, reflux condenser, thermometer and inert gas inlet tube is charged with 1211.5 parts of a commercial epoxy resin based on bisphenol A with an epoxide equivalent weight (EEW) of 186 g/eq, 95.7 parts of phenol, 47.5 parts of n-butoxypropanol, and 278.5 parts of bisphenol A, and this initial charge is heated to 127° C. under nitrogen. With stirring, 1.6 parts of triphenylphosphine are added, whereupon there is an exothermic reaction and the temperature climbs to 170° C. The mixture is cooled again to 130° C. and then the epoxide content is checked. The EEW of 521 g/eq indicates that all of the phenolic OH groups have reacted. Then 158.9 parts of Pluriol P 900 (polypropylene glycol MW 900, BASF) are added with simultaneous cooling. 5 minutes later, with further cooling, at 120° C., 117.7 parts of diethanolamine are added. As soon as the temperature has fallen to 100° C. (30 minutes) after a brief exotherm (Tmax 127° C.), 57.2 parts of N,N-dimethylaminopropylamine are added. After a brief exotherm (Tmax 145° C.), the batch is allowed to continue reacting at 130° C. for 2 hours until the viscosity remains constant (1280 mPas, Brookfield CAP 200+ viscometer, at 23° C., CAP 03 cone, 5000 1/s, 51% in Solvenon PM (BASF)). Subsequently with simultaneous cooling, 1031.5 parts of crosslinker 1 are added, and the product is discharged at 105° C.

2194.1 parts of the mixture, which is still hot, are dispersed immediately in an initial charge mixture of 1401.9 parts of fully demineralized water and 31.0 parts of 85% strength formic acid, with intensive stirring. Following brief homogenization, dilution takes place with a further 1247.1 parts of fully demineralized water, and the diluted dispersion is filtered over K900 plate filters (from Seitz). Distillative removal of solvents does not take place, since the dispersion is already obtained in a low-solvent form. The characteristics possessed by the dispersion are as follows:

Solids content: 40.5%
Base content: 0.785 meq/g resin solids*)
Acid content: 0.308 meq/g resin solids*)
Mean particle size: 114 nm**)
Sedimentation stability: no sediment after 2 months' storage time at room temperature

*) milliequivalents/gram resin solids
**) measured with Zetasizer Nano S90 photon correlation spectrometer from Malvern Binder Dispersion 4 (Comparative)

Preparation of a Low-Solvent Aqueous Binder Dispersion Comprising a Cathodically Depositable Synthetic Resin with Hydroxyl Groups, but without Primary Amino Groups, and Comprising the Crosslinker 2.

The procedure for the binder dispersion 3 example is carried out. Now, however, instead of the 1031.5 parts of crosslinker 1, 1031.5 parts of a preliminary dilution of 916.9 parts of comparative crosslinker 2 and 83.0 parts of Pluriol C 1651 and 31.6 parts of ethanol are added (corresponding in terms of solids content to the amount of crosslinker 1 in the binder dispersion 3 example). The dispersion is discharged then at 105° C., and the procedure is analogous to example 3:

2194.1 parts of the mixture, which is still hot, are dispersed in an initial charge mixture of 1401.9 parts of fully demineralized water and 31.0 parts of 85% strength formic acid, with intensive stirring. Following brief homogenization, dilution takes place with a further 1247.1 parts of fully demineralized water, and the diluted dispersion is filtered over K900 plate filters (from Seitz). Distillative removal of solvents does not take place, since the dispersion is already obtained in a low-solvent form. The characteristics possessed by the dispersion are as follows:

Solids content: 40.2%
Base content: 0.761 meq/g resin solids*)
Acid content: 0.309 meq/g resin solids*)
Mean particle size: 120 nm**)
Sedimentation stability: no sediment after 2 months' storage time at room temperature

*) milliequivalents/gram resin solids
**) measured with Zetasizer Nano S90 photon correlation spectrometer from Malvern Electrocoat Materials C and D Preparation of Electrocoating Baths C and D and Deposition of Coating Films Electrocoating baths are prepared in line with the procedure described for the preparation of electrocoat materials A and B and in accordance with the mass amounts listed in table 5.

TABLE 5

Electrocoat materials C and D

| Components and fractions: | Bath C (inventive) | Bath D (comparative) |
|---|---|---|
| Binder dispersion 3 | 2112.0 | |
| Binder dispersion 4 | | 2112.0 |
| Fully demineralized water | 2401.2 | 2401.2 |
| Pigment paste B | 286.8 | 286.8 |
| Total | 4800 | 4800 |

In accordance with the deposition conditions specified for electrocoat materials A and B, films are produced on cathodically connected, zinc-phosphatized steel test panels without a Cr(VI) rinse in the pretreatment process. These coated panels, after rinsing, are cured in accordance with the baking conditions identified in table 6 (20 minutes at 160° C. or 175° C.), to give films with a thickness of 20 μm.

TABLE 6

Film properties and glass transition temperatures Tg of the resulting E-coat systems C and D

| | E-coat system C | E-coat system D (comparative) |
|---|---|---|
| Film thickness (μm) | 21.2 | 20.4 |
| Leveling | very good | very good |
| Glass transition temperature Tg (160° C.) | 78 | 67 |
| Glass transition temperature Tg (175° C.) | 81 | 80 |

The 67° C. Tg glass transition temperature of the comparative paint system D on 160° C. baking shows as yet incomplete crosslinking by comparison with the 80° C. Tg at 175° C. baking. In contrast, the 78° C. Tg on 160° C. baking shows the inventive E-coat system C to be almost at the end state (Tg=81° C. on 175° C. baking). Even at 160° C., the crosslinking density for coating system C has developed further than in the case of the comparative coating system D, and therefore exhibits improved underbake security in comparison to the prior art.

What is claimed is:

1. An aqueous binder dispersion for a cathodic electrocoat material, the aqueous binder dispersion comprising
    at least one amine-modified hydroxy-functional epoxy resin as a binder, and
    at least one fully blocked polyisocyanate blocked at least partly with 2,2-dimethyl-1,3-dioxolane-4-methanol as a crosslinker.

2. The aqueous binder dispersion of claim 1, wherein, based on the isocyanate groups originally present in the fully blocked polyisocyanate, 50 to 100 mol % of the isocyanate groups are blocked with 2,2-dimethyl-1,3-dioxolane-4-methanol.

3. The aqueous binder dispersion of claim 2, wherein 90 to 100 mol % of the isocyanate groups are blocked with 2,2-dimethyl-1,3-dioxolane-4-methanol.

4. The aqueous binder dispersion of claim 3, wherein 100 mol % of the isocyanate groups are blocked with 2,2-dimethyl-1,3-dioxolane-4-methanol.

5. The aqueous binder dispersion of claim 1, wherein the polyisocyanate is an aromatic polyisocyanate.

6. The aqueous binder dispersion of claim 1, wherein the polyisocyanate is an oligomeric polyisocyanate.

7. The aqueous binder dispersion of claim 1, wherein the polyisocyanate has an NCO functionality of 2.4 to 4.

8. The aqueous binder dispersion of claim 1, wherein the polyisocyanate is based on 4,4'-diphenylmethane diisocyanate.

9. The aqueous binder dispersion of claim 1, wherein the polyisocyanate is an oligomeric 4,4'-diphenylmethane diisocyanate having an NCO functionality of 2.4 to 4.

10. The aqueous binder dispersion of claim 1, wherein the blocked polyisocyanate is used in an amount of 5 to 50 wt %, based on the binder.

11. The aqueous binder dispersion of claim 1, wherein the epoxy resin is prepared in the presence of the crosslinker.

12. A process for cathodic electrocoating of an electrically conductive substrate, the process comprising:
    1) immersing the electrically conductive substrate into an aqueous electrocoat material comprising the aqueous binder dispersion of claim 1 and at least one cathodically depositable binder,
    2) connecting the electrically conductive substrate as cathode,
    3) depositing a coating film on the electrically conductive substrate with direct current, thereby obtaining a coated substrate,
    4) removing the coated substrate from the electrocoat material, and
    5) baking the deposited coating film.

13. The process of claim 12, wherein the electrically conductive substrate is an automobile body or a part thereof.

14. An electrocoat material, comprising the aqueous binder dispersion of claim 1.

* * * * *

UNITED STATES PATENT AND TRADEMARK OFFICE
CERTIFICATE OF CORRECTION

| | | |
|---|---|---|
| PATENT NO. | : 10,501,646 B2 | Page 1 of 1 |
| APPLICATION NO. | : 15/514406 | |
| DATED | : December 10, 2019 | |
| INVENTOR(S) | : Guenther Ott et al. | |

It is certified that error appears in the above-identified patent and that said Letters Patent is hereby corrected as shown below:

In the Specification

Column 5, Line 20, "ethylenebromo-hydrin," should read -- ethylenebromohydrin, --, Column 5, Line 32, "butyl amine," should read -- butylamine, --, Column 5, Line 34, "2 ethylimidazole;" should read -- 2-ethylimidazole; --, Column 8, Line 56, "calorimetry" should read -- Calorimetry --, Column 8, Line 59, "calorimetry" should read -- Calorimetry --.

Signed and Sealed this
Fifth Day of May, 2020

Andrei Iancu
*Director of the United States Patent and Trademark Office*